J. A. MILLER.
Mincing-Machine.
No. 162,247.  Patented April 20, 1875.
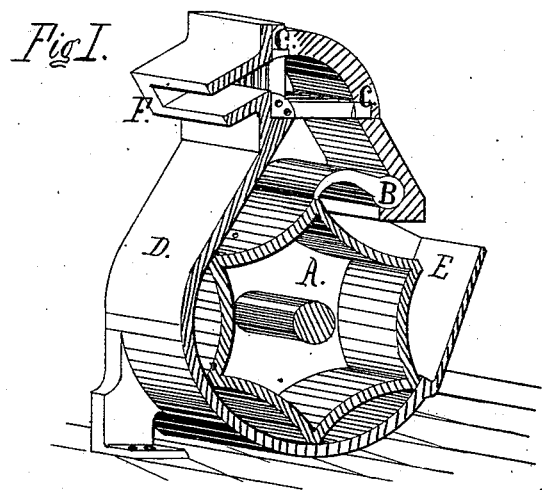
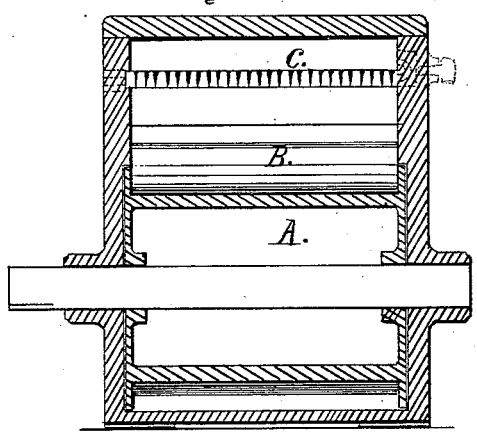 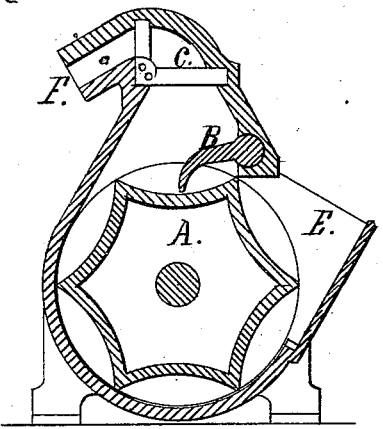
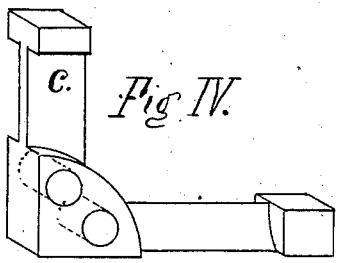
Witnesses
Henry J. Miller
Joseph A. Miller Jr.
Inventor
Joseph A. Miller

UNITED STATES PATENT OFFICE.

JOSEPH A. MILLER, OF PROVIDENCE, RHODE ISLAND.

IMPROVEMENT IN MINCING-MACHINES.

Specification forming part of Letters Patent No. 162,247, dated April 20, 1875; application filed March 26, 1874.

*To all whom it may concern:*

Be it known that I, JOSEPH A. MILLER, of the city of Providence, State of Rhode Island, have invented a new and useful Improvement in Mincing-Machines; and I do hereby declare that the following is a full, clear, and exact description of the same, reference being had to the accompanying drawings, forming part of this specification, in which—

Figure I is a sectional perspective view of my machine. Fig. II is a vertical transverse section of the same. Fig. III is a cross-section, showing the propelling-cylinder A, the abutment B, the knives C, and the hopper E. Fig. IV is an enlarged view of one of the knives C.

My invention consists in placing within a case having at one end the hopper E, and at the other end the knives C, the cylinder A, having a number of concave receptacles or grooves on its periphery, by which the material to be minced is carried from the hopper E around the case until the same encounters the abutment B, where the material is forced into the narrow passage, and between the knives C. The object of the invention is to compress meat or vegetables to be minced, so that the same may be more readily cut by the knives.

The operation of the machine is as follows: When the hopper E is filled with meat, and rotary motion is imparted to the cylinder A, the grooves on the periphery of the same carry the meat downward and into the case; and to prevent any meat from passing between the edges of the cylinder A and the case, a knife is placed in the bottom of the hopper E, whose edge is close to the passing edges of the cylinder, so that in passing the knife the meat will be cut, and will thus be prevented from passing along under these edges, but compelled to enter the concave grooves. When the meat reaches the abutment B it is forced to enter the contracted passage, in which the knives C are located, and in being forced through and between the same it is cut into pieces corresponding in size to the distance from one knife to the other, and is so discharged.

In place of the stationary knives C, revolving knives may be used close by the discharge-opening, to cut the material discharged through the narrow opening, and which has previously been compressed by the cylinder A and abutment B, and forced into the discharge-passage.

When tallow is to be minced in this machine I connect a steam-pipe with the holes shown in the connecting-block of the knives, by which means the same are slightly heated, and the knives so heated will cut tallow more readily than when cold.

Having thus described my invention, I claim as new and desire to secure by Letters Patent—

1. The combination of the fluted cylinder A and abutment B with the knives C, arranged as and for the purpose described.

2. The knives C, having holes near their ends, arranged substantially as shown, so that when placed together these holes form steam-passages, so that the knives may be heated, substantially as and for the purpose herein set forth.

JOSEPH A. MILLER.

Witnesses:
FRANCIS A. DANIELS,
P. E. HAYES.